United States Patent
Sampson et al.

(10) Patent No.: US 11,720,650 B2
(45) Date of Patent: Aug. 8, 2023

(54) METHODS AND APPARATUS FOR TRAINING A CLASSIFICATION MODEL BASED ON IMAGES OF NON-BAGGED PRODUCE OR IMAGES OF BAGGED PRODUCE GENERATED BY A GENERATIVE MODEL

(71) Applicant: Tiliter Pty Ltd., Sydney (AU)

(72) Inventors: Christopher Bradley Rodney Sampson, Sydney (AU); Sufyan Asghar, Bavaria (DE); Rui Dong, Sydney (AU)

(73) Assignee: Tiliter Pty Ltd., Sydney (AU)

( * ) Notice: Subject to any disclaimer, the term of this patent is extended or adjusted under 35 U.S.C. 154(b) by 188 days.

(21) Appl. No.: 17/085,585

(22) Filed: Oct. 30, 2020

(65) Prior Publication Data
US 2022/0138488 A1 May 5, 2022

(51) Int. Cl.
*G06K 9/62* (2022.01)
*G06F 18/2431* (2023.01)
(Continued)

(52) U.S. Cl.
CPC ........ *G06F 18/2431* (2023.01); *G06F 18/214* (2023.01); *G06N 3/045* (2023.01); *G06N 3/088* (2013.01)

(58) Field of Classification Search
CPC .... G06K 9/628; G06K 9/6256; G06N 3/0454; G06N 3/088; G06N 20/20; G06V 10/774; G06V 10/82; G06V 10/764; G06T 7/0008
(Continued)

(56) References Cited

U.S. PATENT DOCUMENTS 9,600,982 B2 * 3/2017 MacIntosh ................ G06T 7/73
10,453,223 B2 10/2019 Cinnamon et al.
(Continued)

FOREIGN PATENT DOCUMENTS

CN 110709865 A 1/2020
CN 111814660 A * 10/2020
WO WO-2019119047 A1 6/2019

OTHER PUBLICATIONS

International Search Report and Written Opinion for International Application No. PCT/IB2021/060061 dated Dec. 23, 2021, 10 pages.
(Continued)

*Primary Examiner* — Juan A Torres
(74) *Attorney, Agent, or Firm* — Cooley LLP (57) ABSTRACT

In some embodiments, a method can include receiving first images of produce. The method can further include executing a first machine learning model to generate second images of produce based on the first images of produce. The first images of produce can include (1) images of non-bagged produce or (2) images of bagged produce. The second images of produce can include the other of (1) images of non-bagged produce or (2) images of bagged produce. The method can further include training a second machine learning model based on the first images of produce and the second images of produce. The method can further include executing, after the training, the second machine learning model to classify as a bagged produce or a non-bagged produce an image not included in the first images and not included in the second images.

21 Claims, 7 Drawing Sheets
(2 of 7 Drawing Sheet(s) Filed in Color)

(51) Int. Cl.
*G06N 3/088* (2023.01)
*G06F 18/214* (2023.01)
*G06N 3/045* (2023.01)

(58) Field of Classification Search
USPC .......................................................... 382/110
See application file for complete search history.

(56) References Cited

U.S. PATENT DOCUMENTS

| | | |
|---|---|---|
| 10,592,779 B2 | 3/2020 | Madani et al. |
| 10,664,722 B1 * | 5/2020 | Sharma ................ G06V 10/764 |
| 2019/0236362 A1 * | 8/2019 | Srivastava ............. G06V 10/10 |
| 2020/0117954 A1 | 4/2020 | Jiang et al. |
| 2020/0311903 A1 | 10/2020 | Tsutsumi et al. |
| 2020/0357045 A1 | 11/2020 | Guo et al. |
| 2020/0379427 A1 * | 12/2020 | Tao ...................... G06N 3/0454 |

OTHER PUBLICATIONS

Li, C. et al., "Data Priming Network for Automatic Check-Out," ArXiv:1904.04978v3, Aug. 2019, 9 pages.
Wei X-S. et al., "RPC: A Large-Scale Retail Product Checkout Dataset," ArXiv:1901.07249v1, Jan. 2019, 24 pages.

* cited by examiner

METHODS AND APPARATUS FOR TRAINING A CLASSIFICATION MODEL BASED ON IMAGES OF NON-BAGGED PRODUCE OR IMAGES OF BAGGED PRODUCE GENERATED BY A GENERATIVE MODEL

TECHNICAL FIELD

The present disclosure relates to the field of artificial intelligence, and in particular to apparatus and methods for training a classification model based on data generated by a generative adversarial network (GAN) for translating images of produce without a bag to images of produce in a bag.

BACKGROUND

Classification of loose produce as produce without a bag (non-bagged produce) or produce in a bag (bagged-produce) can be useful in many applications. For example, classification of produce as a bagged produce or a non-bagged produce can be helpful for grocery store checkouts, storage, theft prevention, and/or the like. Known methods of classification of loose produce to non-bagged produce or bagged produce, however, are labor-intensive and can be costly. Thus, a need exists for apparatus and methods to accurately and efficiently classify loose produce to non-bagged produce or bagged produce.

SUMMARY

In some embodiments, a method can include receiving first images of produce (e.g., fruits, vegetables, and/or the like). The method can further include executing a first machine learning model (e.g., a cycle generative adversarial network (CycleGAN)) to generate second images of produce based on the first images of produce. The first images of produce can include (1) images of non-bagged produce or (2) images of bagged produce. The second images of produce can include the other of (1) images of non-bagged produce or (2) images of bagged produce. The method can further include training a second machine learning model (e.g., a convolutional neural network (CNN)) based on the first images of produce and the second images of produce. The method can further include executing, after the training, the second machine learning model to classify as a bagged produce or a non-bagged produce an image not included in the first images and not included in the second images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The patent or application file contains at least one drawing executed in color. Copies of this patent or patent application publication with color drawing(s) will be provided by the Office upon request and payment of the necessary fee.

Non-limiting examples of various aspects and variations of the embodiments are described herein and illustrated in the accompanying drawings.

One or more embodiments described herein generally relate to apparatus and methods for processing structured and semi-structured data, and in particular, apparatus and methods that use a generative machine learning model to generate synthetic image for efficient and reliable training of a classification model. In some embodiments, produce classification can be used to process, for example, images, videos, time series, stationary data, non-stationary-data, and/or the like.

Described herein are produce classification devices and methods that are suitable for highly reliable classification of images of produce, for example, classification of images of non-bagged produce and/or images of bagged produce. Images of produce can have a wide range of variety in color, texture, lighting, markings, bag types, background, and/or other factors, because of a wide variety in characteristics of types of produce and types of environment at which the images of produce can be taken. Therefore, training a versatile machine learning model that can perform classification tasks in the domain of images of produce can be data-intensive and collecting data to train such versatile machine learning model can be challenging and costly. To solve that challenge, produce classification devices and methods described herein can train a first machine learning model (e.g., a generative machine learning model) that once trained can generate many (thousands, millions, billions, and/or the like) of synthetic images that are suitable for training a second machine learning model (e.g., a classification machine learning model).

While the methods and apparatus are described herein as processing data from a set of files, a set of images, a set of videos, a set of databases, and/or the like, in some instances a produce classification device (e.g., produce classification device 101 described below in connection with FIG. 1) can be used to generate the set of files, the set of images, the set of videos, and/or the set of databases. Therefore, the produce classification device can be used to process and/or generate any collection or stream of data, events, and/or objects. As an example, the produce classification device can process and/or generate any string(s), number(s), image(s), video(s), executable file(s), dataset(s), and/or the like. For further examples, the produce classification device can be used to execute, compile, or process an application programming interface (API), a function(s) of a software code(s), a data file(s), a data stream(s), a model file(s), a source file(s), a script(s), and/or the like.

Figure 1:
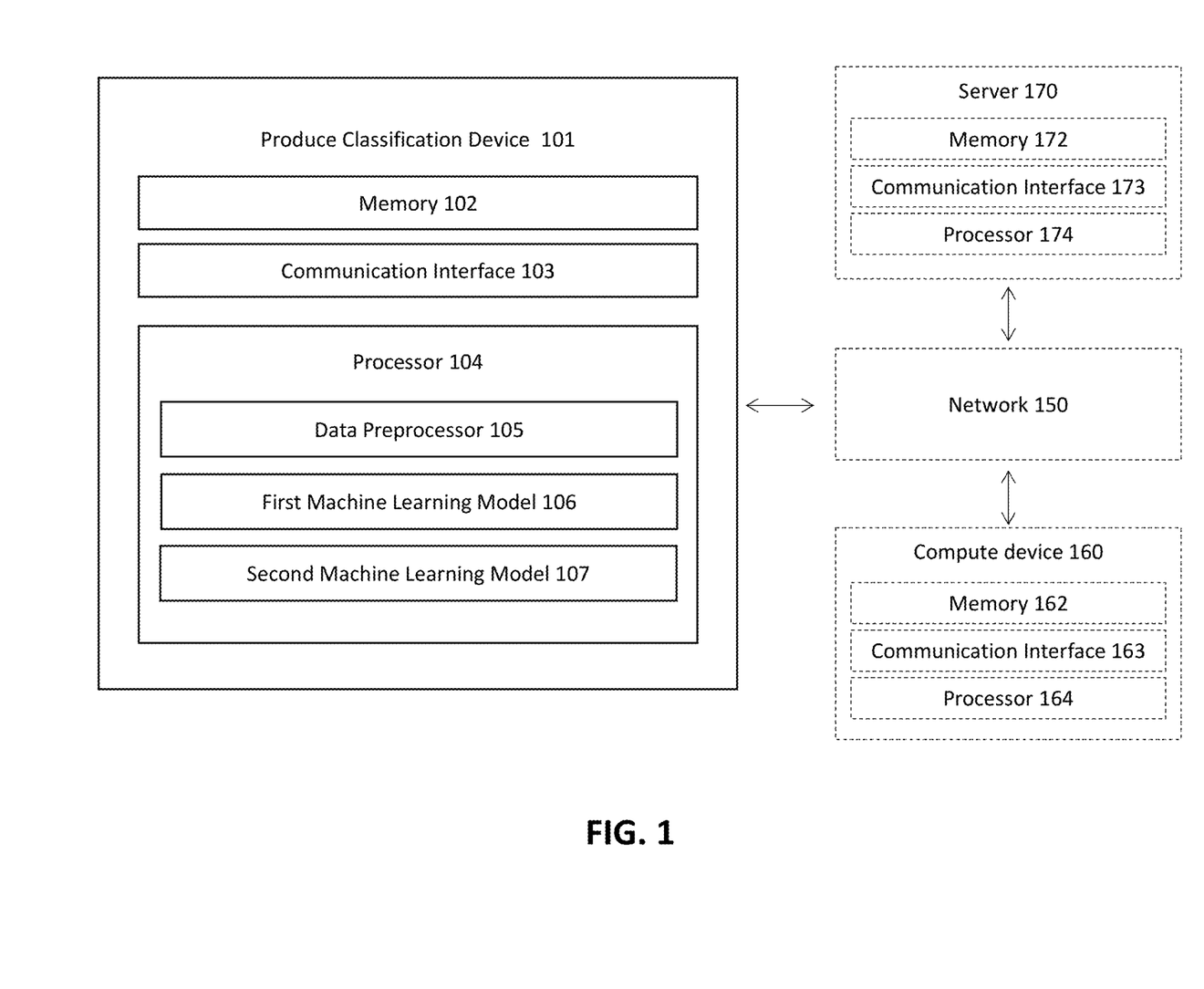
FIG. 1 is a schematic description of a produce classification device, according to an embodiment.

FIG. 1 is a schematic description of a produce classification device 101, according to an embodiment. The produce classification device 101 can be operatively coupled to a compute device 160 and/or a server 170 to transmit and/or receive data and/or analytical models via a network 150. The produce classification device 101, the compute device 160, and the server 170 each can be/include a hardware-based computing device and/or a multimedia device, such as, for example, a computer, a desktop, a laptop, a smartphone, a tablet, a wearable device, and/or the like.

The produce classification device 101 includes a memory 102, a communication interface 103, and a processor 104. The produce classification device 101 includes a data preprocessor 105, a first machine learning model 106, and/or a second machine learning model 107 that collectively classify a set of images of produce to images of bagged produce or images of non-bagged produce. In some embodiments, the produce classification device 101 can receive data including a set of images of produce from a data source(s). The data source(s) can include, for example, an external hard drive operatively coupled to the produce classification device 101, the compute device 160, the server 170, and/or the like. The produce classification device 101 can receive the data in response to a user of the produce classification device 101 and/or the compute device 160 providing an indication to begin generating training data or an indication to begin classifying the set of images of produce. In some embodiments, the produce classification device 101 can receive a set of videos from the data source that can be analyzed frame by frame to generate the set of images of produce.

The memory 102 of the produce classification device 101 can be, for example, a memory buffer, a random access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 102 can store, for example, the set of images of produce, the set of videos, and/or code that includes instructions to cause the processor 104 to perform one or more processes or functions (e.g., a data preprocessor 105, a first machine learning model 106, and/or a second machine learning model 107).

The memory 102 can store a set of files associated with (e.g., generated by executing) the first machine learning model 106, and/or the second machine learning model 107. This set of files can include data generated by the first machine learning model 106, and/or the second machine learning model 107 during the operation of the produce classification device 101. For example, the set of files associated with the first machine learning model 106 and/or the second machine learning model 107 can include temporary variables, return memory addresses, variables, a graph of the first machine learning model 106 and/or the second machine learning model 107 (e.g., a set of arithmetic operations or a representation of the set of arithmetic operations used by the first machine learning model 106 and/or the second machine learning model 107), the graph's metadata, assets (e.g., external files), electronic signatures (e.g., specifying a type of the first machine learning model 106 and/or the second machine learning model 107 being exported, and the input/output tensors), and/or the like, generated during the operation of the first machine learning model 106 and/or the second machine learning model 107.

The communication interface 103 of the produce classification device 101 can be a hardware component of the produce classification device 101 to facilitate data communication between the produce classification device 101 and external devices (e.g., the network 150, the compute device 160, the server 170, and/or the like) or internal components of the produce classification device 101 (e.g., the memory 102, the processor 104). The communication interface 103 is operatively coupled to and used by the processor 104 and/or the memory 102. The communication interface 103 can be, for example, a network interface card (NIC), a Wi-Fi® (ID module, a Bluetooth® module, an optical communication module, and/or any other suitable wired and/or wireless communication interface. The communication interface 103 can be configured to connect the produce classification device 101 to the network 150. In some instances, the communication interface 103 can facilitate receiving or transmitting data via the network 150. For example, in some embodiments, the communication interface 103 can facilitate receiving or transmitting the set of images of produce, the first machine learning model 106, the second machine learning model 107 and/or the like through the network 150 from/to the compute device 160, or the server 170, each communicatively coupled to the produce classification device 101 via the network 150.

The processor 104 can be, for example, a hardware based integrated circuit (IC) or any other suitable processing device configured to run or execute a set of instructions or a set of codes. For example, the processor 104 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 104 is operatively coupled to the memory 102 through a system bus (for example, address bus, data bus, and/or control bus; not shown).

The network 150 can be a digital telecommunication network of servers and/or compute devices. The servers and/or computes device on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), any other suitable communication system, and/or a combination of such networks.

The processor 104 includes a data preprocessor 105, a first machine learning model 106 (also referred to as 'generative machine learning model' or 'generative model'), and a second machine learning model 107 (also referred to as 'classification machine learning model' or 'classification model'). Each of the data preprocessor 105, the first machine learning model 106, or the second machine learning model 107 can include software stored in the memory 102 and executed by the processor 104. For example, a code to cause the first machine learning model 106 to generate a set of images of bagged produce from a set of images of non-bagged produce and/or vice versa can be stored in the memory 102 and executed by the processor 104. Alternatively, each of the data preprocessor 105, the first machine learning model 106, and/or the second machine learning model 107 can be a hardware-based device. For example, a process to cause the second machine learning model 107 to classify an image as bagged produce or non-bagged produce can be implemented on an individual integrated circuit chip.

The data preprocessor 105 can receive data including a set of images of produce from the data sources and generate a preprocessed data. The set of images of produce can include a set of images of non-bagged produce and a set of images of bagged produce. The preprocessed data can be processed by the data preprocessor 105 such that the first machine learning model 106 or the second machine learning model 107 are trained and executed more accurately and efficiently compared to when the first machine learning model 106 or the second machine learning model 107 are trained and executed based on the data as received (without preprocessing). In some instances, the data preprocessor 105 can identify and/or extract a set of features in the set of images of produce. For example, a portion of an image from the set of images of produce can include a background and the data preprocessor can be configured to crop out that portion of the image.

In some instances, the data preprocessor 105 can receive and normalize the set of images of produce to a common scale for analyzing the set of images of produce in a cost efficient and accurate manner. Normalization can involve transforming data into a common format to improve cross-compatibility of the set of images of produce among various processes and/or models of the produce classification device 101. In some instances, the data preprocessor 105 can format the set of images of produce to a common encoding format such as tagged image file format (TIFF), bitmap image file (Bitmap), joint photographic expert group (JPEG), graphics interchange format (GIF), portable network graphics (PNG), and/or the like. In some instances, the data preprocessor 105 can format the set of images of produce to be the same image size. For example, the data preprocessor 105 can resize every image to 336 pixels by 336 pixels, 300 pixels by 400 pixels, and/or any suitable dimension. In some instances, the data preprocessor 105 can normalize the set of images of produce to a same color coding. For example, in some instances, the set of images can be converted to a grayscale image.

In some instances, the data preprocessor 105 can receive and generate augmented images from the set of images of produce to diverse representations of the set of images and/or increase the number of unique images for training the first machine learning model 106 and/or the second machine learning model 107. In some instances, augmenting an image of produce from the set of images of produce may involve normalizing brightness of the image of produce, adding noise (e.g., a random noise) to the image of produce, white-balancing the image of produce, adding a background to the image of produce, and/or the like. In some instances, augmenting the set of images of produce may involve rotating the set of images of produce, distorting the set of images of produce, color casting the set of images of produce, resizing the set of images of produce, filtering the set of images of produce, and/or the like. Augmenting the set of images as described above can help generalizing the first machine learning model and the second machine learning model for a robust classification of images of produce.

The first machine learning model 106 (e.g., the generative machine learning model) can be configured to receive the preprocessed data in batches of data. In some instances, the preprocessed data can be divided into batches of data based on a memory size, memory type, and/or the like. In some instances, the preprocessed data can be divided into batches of data based on a type of the processor 104 (e.g., CPU, GPU, and/or the like), number of cores of the processor 104, and/or the like. The machine learning model 106 can include a set of model parameters such as a weight(s), a bias(s), or an activation function(s) that can be executed to generate images of bagged produce based on images of non-bagged produce. In some instances, the machine learning model 106 can be executed to generate images of non-bagged produce based on images of bagged produce. The machine learning model can be or include at least one of a deep neural network model, an artificial neural network (ANN) model, a fully connected neural network, a convolutional neural network (CNN), a generative adversarial network (GAN), a K-Nearest Neighbors (KNN) model, a Support Vector Machine (SVM), and/or a decision tree.

Specifically, in some embodiments, the first machine learning model can be a cycle generative adversarial network (CycleGAN) that includes a first generator network configured to generate an image of bagged produce from an image of non-bagged produce (and/or vice versa) and a first discriminator network configured to generate a first loss value that calculates a first similarity score of the image of bagged produce generated by the first generator network to a real image of bagged produce (an image captured by a camera). The CycleGAN further includes a second generator network configured to generate an image of non-bagged produce from an image of bagged produce, and a second discriminator network configured to generate a second loss value that calculates a second similarity of the image of non-bagged produce generated by the second generator to a real image of non-bagged produce (an image captured by a camera). In some instances, the first similarity score and/or the second similarity score can be calculated using a pixel wise mean squared error, structural similarity index, and/or the like. Weights and biases of the first generator network and/or weights and biases of the second generator network can be adjusted to improve the first similarity score and/or the second similarity score based on at least one optimization algorithm (e.g., Adam optimization algorithm).

Each of the first generator network, the first discriminator network, the second generator network, or the second discriminator network can be or include a neural network configured to have an input layer, an output layer, and one or more hidden layers including a normalization layer, a hidden layer, a dropout layer, and/or an activation layer, and/or the like. The CycleGAN can be trained iteratively to minimize the first loss value and/or the second loss value. Therefore, once trained the CycleGAN can be configured to generate an image of bagged produce from an image of non-bagged produce. In some embodiments, the CycleGAN can be configured generate an image of non-bagged produce from an image of bagged produce. In use the first machine learning model 106 is executed multiple time to generate a set (e.g., tens, hundreds, thousands, millions, billions, etc.) of images of bagged produce (generated using the produce classification device 101) from image of non-bagged produce (e.g., captured by camera, extracted from a video, and/or the like).

The second machine learning model 107 (e.g., the classification machine learning model) can be configured to receive the set of images of bagged produce and the set of images of non-bagged produce in batches of data. The machine learning model 107 can include a set of model parameters such as a weight(s), a bias(s), or an activation function(s) that can be executed to classify each image from the set of images of bagged produce and the set of images of non-bagged produce as a bagged produce or a non-bagged produce. The set of model parameters can be tuned, during a tuning phase of the machine learning model 107, based on correctness of the classification for each image from the set of images of bagged produce and the set of images of non-bagged produce. Once trained the machine learning model 107 can classify as a bagged produce or a non-bagged produce an image not included in the set of images of non-bagged produce and not included in the set of images of bagged produce. The machine learning model 107 can be or include at least one of a deep neural network model, an artificial neural network (ANN) model, a fully connected neural network, a convolutional neural network (CNN), a generative adversarial network (GAN), a K-Nearest Neighbors (KNN) model, a Support Vector Machine (SVM), and/or a decision tree.

In use, the production classifier device 101 can receive a first set of images of produce and a second set of images of produce. The first set of images of produce and the second set of images of produce can include images of non-bagged produce and/or images of bagged produce. In some instances, the first set of images of produce and the second set of images or produce can be preprocessed by the data preprocessor 105 to be put in a condition (e.g., resized to a 200 pixels by 200 pixels image) for training and/or executing the first machine learning model 106. The first set of images of produce can be associated with the second set of images of produce such that (a) each image of bagged produce from the first set of images of produce is labeled with an image of non-bagged produce from the second set of images of produce and/or (b) each image of non-bagged produce from the first set of images of produce is labeled with an image of bagged produce from the second set of images of produce. For example, the first set of images of produce can include an image of bagged apples and an image of non-bagged oranges and the second set of images of produce can include an image of non-bagged apples and an image of bagged oranges. The first set of images of produce can be associated with the second set of images of produce such that the image of bagged apples is labeled with the image of non-bagged apples and the image of non-bagged oranges is labeled with the image of bagged oranges.

As a result, the first machine learning model 106 can be trained based on the first set of images of produce that are associated with the second set of images of produce. After training, the machine learning model 106 can be executed on a third set of images of produce (including images of non-bagged produce and/or images of bagged produce) to produce a fourth set of images of produce (other of images of non-bagged produce and/or images of bagged produce of the third set of images). The fourth set of images are generated by the first machine learning model 106 and include synthetic images. In some instances, the third set of images of produce and/or the fourth set of images of produce can include a large number of images such as, for example, 10,000 images of produce, 100,000 images of produce, 1,000,000 of images, and/or the like.

In some embodiments, the produce classification device 101 can augment synthetic images generated by the first machine learning model. For examples, a subset of images from the fourth set of images can be augmented by overlaying each synthetic image from the subset of images on a background image from a subset of background images.

After generating the fourth set of images of produce, the second machine learning model 107 can be trained based on the third set of images of produce and/or the fourth set of images of produce that include synthetic images and non-synthetic images. Each image from the third set of images of produce and/or the fourth set of images of produce can be associated with a label (e.g., a Boolean variable) indicating whether that image is an image of bagged produce or a an image of non-bagged produce. After training, the second machine learning model 107 can be executed by the produce classification device 101 to receive an image and classify the image as a bagged produce image or a non-bagged produce image. For example, in some instances, the second machine learning model 107 can generate a '0' when the image is a non-bagged produce or generate a '1' when the image is a bagged produce. For example, in some instances, the second machine learning model 107 can generate a float number between a normalized range (e.g., from 0 to 1) to classify the image as a bagged produce image or a non-bagged produce image. In such instances, a proximity of the float number to 0 or 1 could indicate a confidence of classification.

In some embodiments, the produce classification device 101 can optionally transmit, after training, the first machine learning model 106 and/or the second machine learning model to the compute device 160 and/or the server device 170.

The compute device 160 can be/include a hardware-based computing device and/or a multimedia device operatively coupled to the produce classification device 101. The compute device 160 can be configured to transmit and/or receive data and/or analytical models to/from the produce classification device 101. For example, in some implementations, the compute device 160 can be a device at a grocery store that can receive, after produce classification device 101 training, the second machine learning model 107 to classify an image as an image of bagged-produce or an image of non-bagged produce. The user device 160 can include a memory 162, a communication interface 163 and/or a processor 164 that are structurally and/or functionally similar to the memory 102, the communication interface 103 and/or the processor 104 as shown and described with respect to the produce classification device 101.

The server 170 can be/include a compute device medium particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory 172, a communication interface 173 and/or a processor 174 that are structurally and/or functionally similar to the memory 102, the communication interface 103 and/or the processor 104 as shown and described with respect to the produce classification device 101. In some embodiments, however, the memory 172 can include application specific storage (e.g., deep learning storage servers) that is structurally and/or functionally different from the memory 102. Similarly, in some implementations, the processor 174 can include application specific processors (e.g., GPU rack servers) that are structurally and/or functionally different from the memory 102.

The compute device 160 can be configured to receive and execute a copy of the first machine learning model 106 and a copy of the second machine learning model 107 to classify an image received from a peripheral device operatively coupled to the compute device 160 and/or the server device 170. For example, the compute device 160 and/or the server device 170 can be operatively coupled to a camera of a grocery store that captures and transmits the image to the compute device 160 and/or the server device 170. In response to receiving the image, the second compute device 160 and/or the server device 170 can be configured to classify the image as an image of bagged produce or an image of non-bagged produce. In some implementations, the server device 170 can include a data storage that can store the first set images of produce, the second set images of produce, the third set images of produce, and/or the fourth set images of produce in whole or in part. In some implementations, the server device 170 can include a processing unit (e.g., multiple GPUs) that can efficiently train and/or execute the copy of the first machine learning model 106 and/or the copy of the second machine learning model 107 while stored at server 170 and/or compute device 160.

Although the produce classification device 101, the compute device 160, and the server 170 are shown and described as singular devices, it should be understood that, in some embodiments, one or more produce classification devices, one or more compute device, and/or one or more server devices can be used in a recognition system.

Figure 2:
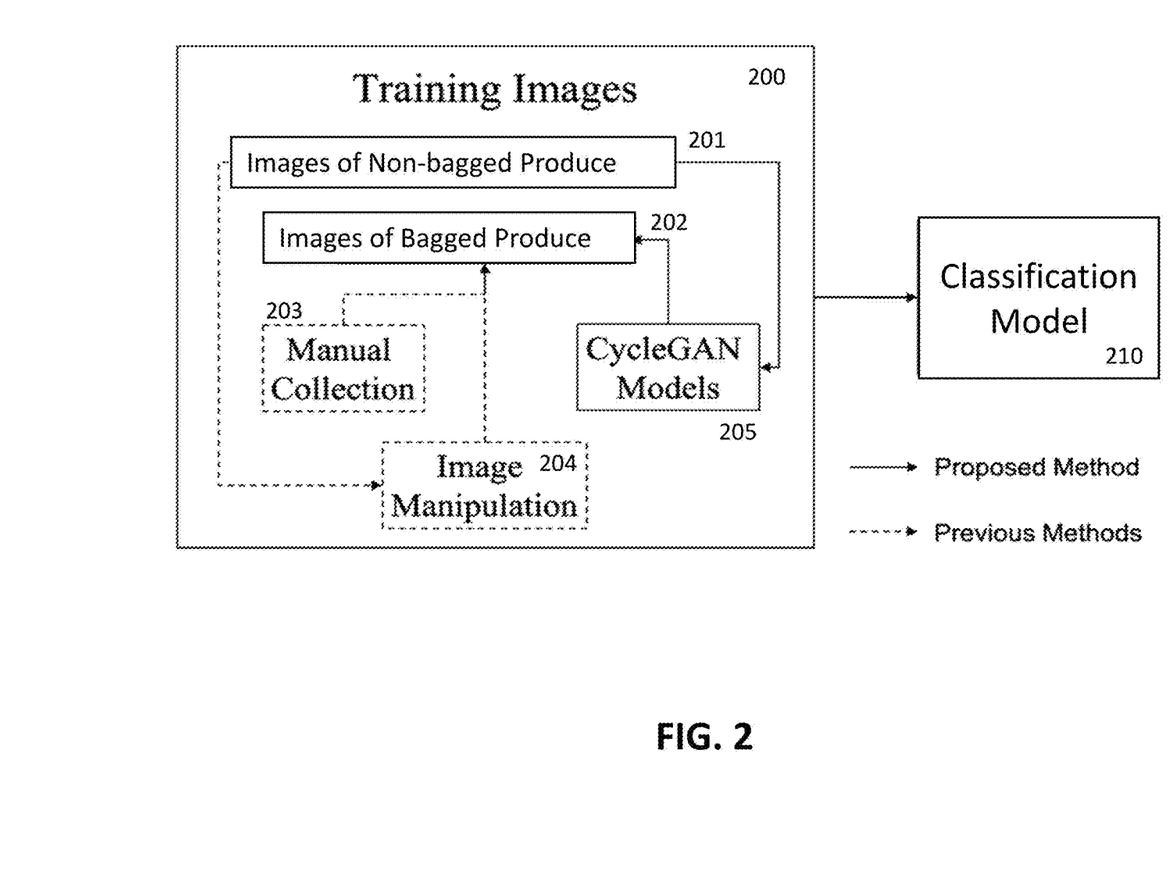
FIG. 2 is a schematic description of a method of using a produce classification device, according to an embodiment.

FIG. 2 is a schematic description of a method of training and using a produce classification device, according to an embodiment. The method of training and using the produce classification device (such as the produce classification device 101 as shown and described with respect to FIG. 1) can involve a first process to generate 200 training images of bagged produce 202 from images of non-bagged produce 201 and a second process to train a classification model 210 based on the images of non-bagged produce and images of bagged produce. Although the first process could be collected manually 203, in practice, training the classification model 210 is usually data intensive and could be very costly and time consuming to manually collect data used to train a robust classification model 210. On the other hand, although image manipulation 204 could be also used to collect data, such a method alone is also often insufficient to generate the data used to train the robust classification device 210 and can generate unrealistic synthetic images. Therefore, a CycleGAN model 205 is trained and executed to generate the data. In some embodiments, a combination of all manual collection 203, image manipulation 204, and CycleGAN model 205 is used to generate the data for training the classification model 210. In some embodiments, manual collection 203 and/or image manipulation 204 can be used to generate data for training the CycleGAN model 205, and further data from manual collection 203 and/or image manipulation 204 not generated and/or used.

Figure 3:
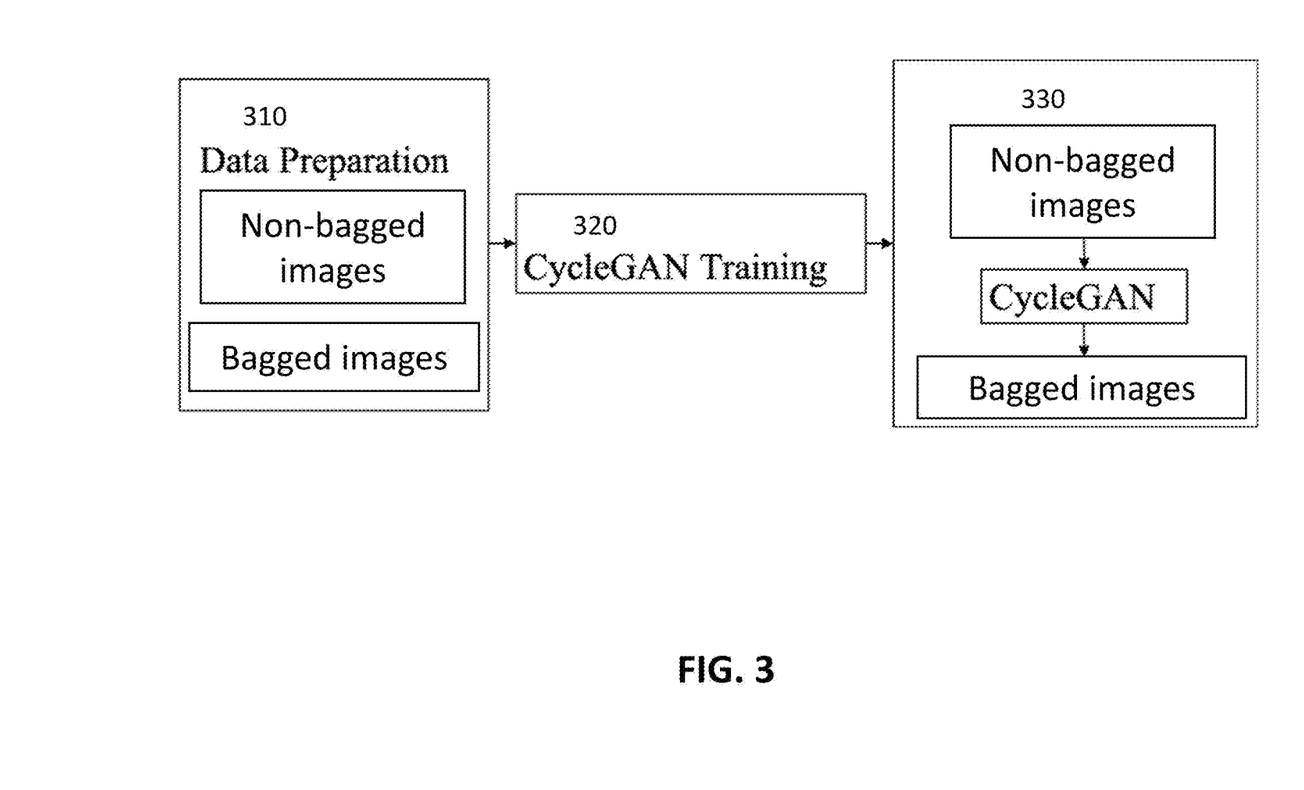
FIG. 3 a schematic description of a method of generating synthetic images, according to an embodiment.

FIG. 3 is a schematic description of a method of generating synthetic images, according to an embodiment. The method of generating synthetic images can be performed by a produce classification device (such as the produce classification device 101 as shown and described with respect to FIG. 1) and can involve a first process for data preparation 310 of a first set of images, a second process for training a CycleGAN 320 based on the first set of images, and a third process of executing the CycleGAN 330 to generate synthetic images.

Figure 4:
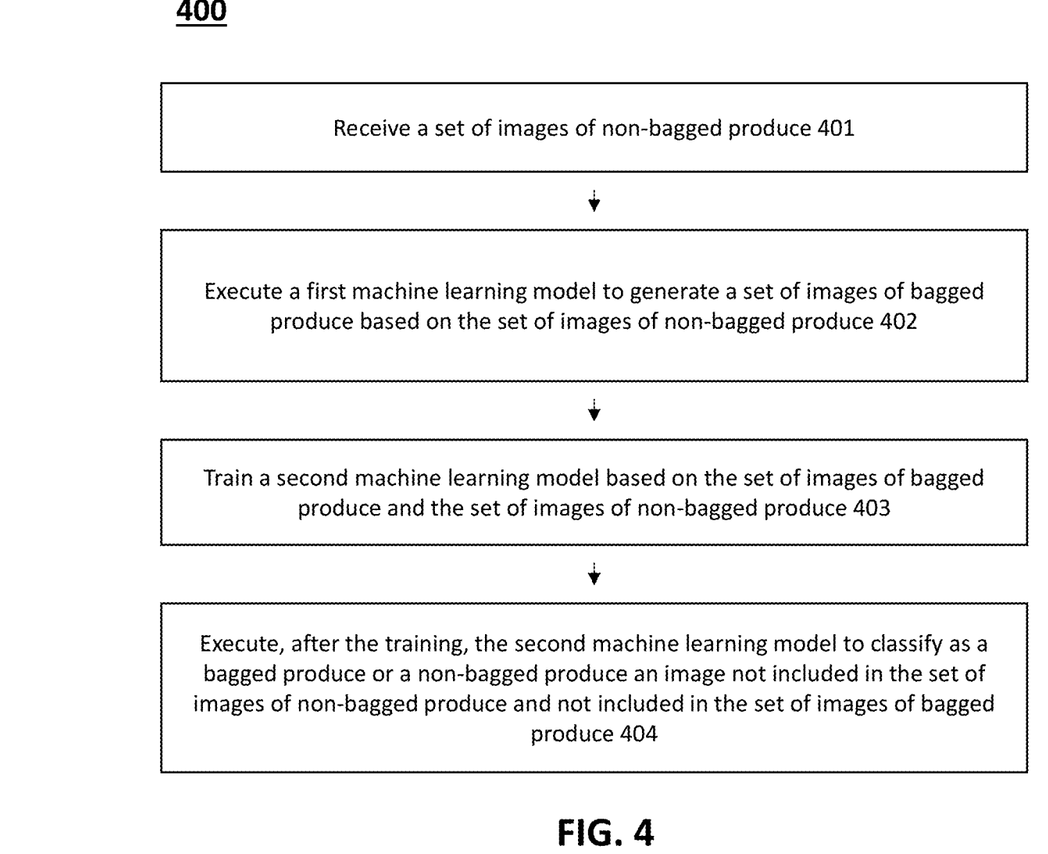
FIG. 4 is a flowchart showing a method of produce classification, according to an embodiment.

FIG. 4 is a flowchart showing a method 400 of produce classification, according to an embodiment. In some implementations, a produce classification device (such as the produce classification device 101 as shown and described with respect to FIG. 1) can be used to perform the method 400. At 401, the produce classification device can receive a set of images of non-bagged produce. At 402, the produce classification device can execute a first machine learning model (such as the first machine learning model 106 as shown and described with respect to FIG. 1) to generate a set of images of bagged produce based on the set of images of non-bagged produce. In some instances, the machine learning model can be trained in a cycle generative adversarial network (CycleGAN). The CycleGAN can include a first generative network that generates synthetic images of bagged produce from images of non-bagged produce and a first discriminator network that calculates a first similarity score based on the images of bagged produce generated by the first generator network to real images of bagged produce. The CycleGAN can further include a second generative network that generates synthetic images of non-bagged produce from the images of bagged produce and a second discriminator network that calculates a second similarity score based on the images of synthetic images of non-bagged produce to the images of non-bagged produce.

At 403, the produce classification device can train a second machine learning model (such as the second machine learning model 107 as shown and described with respect to FIG. 1) based on the set of images of bagged produce and the set of images of non-bagged produce that include synthetic images and non-synthetic images. In some embodiment, the machine learning model 107 can be a deep neural network model that includes at least one convolutional layer. The deep neural network model can be particularly suitable (compared to a shallow neural network model) for classification of images of produce that have a variety of colors and textures. Training the deep neural network model can be data intensive. Therefore, synthetic images of produce (the synthetic images of bagged produce and/or the synthetic images of non-bagged produce) are generated using the first machine learning model 106 to (a) reduce labor required to capture real images and (b) train the second machine learning model to be robust to variations in the images of produce. At 404, the produce classification device can execute, after the training, the second machine learning model to classify as a bagged produce or a non-bagged produce an image not included in the set of images of non-bagged produce and not included in the set of images of bagged produce.

In some embodiments, the set of images of non-bagged produce can include a first subset of images from the set of images of non-bagged produce and a second subset of images from the set of images of non-bagged produce. In some instance, the set of images of non-bagged produce can includes a third subset of images, a fourth subset of images, and/or the like. The first subset of images can include images of non-bagged produce of a first type and not a second type, the second subset of images having images of non-bagged produce of the second type and not the first type. The first type and/or the second type (third type, fourth type, and so forth) can include, for example, organic type (e.g., organic produce, inorganic produce, and/or the like), type of produce (e.g., vegetable, fruit, nut, meat, and/or the like), type of bag (e.g., transparent bag, green bag, blue bag, red bag, net bag, paper bag, plastic bag, and/or the like), specific type of produce (e.g., apple, orange, banana, parsley, mint, and/or the like), and/or the like. Similarly, the set of images of bagged produce can include a first subset of images from the set of images of bagged produce and a second subset of images from the set of images of bagged produced. The first subset of images can include images of bagged produce of the first type and not the second type, and the second subset of images can include images of bagged produce of the second type and not the first type. The method 400 can optionally include executing the second machine learning model to classify an image as a bagged produce of the first type, a bagged produce of the second type, a non-bagged produce of the first type, or a non-bagged produce of the second type.

In some embodiments, the first machine learning model can be trained based on the set of images of non-bagged produce and the first subset of images from the set of images of bagged produce but not the second subset of images from the plurality of images of bagged produce. For example, the first machine learning model can be trained on the set of images of non-bagged produce and the first subset of images of bagged produce that include transparent bags (i.e., the first type) but not bagged produce that include net bags (i.e. the second type). Therefore, once trained, the first machine learning model only generates images of bagged produce with transparent bags but does not generate images of produce with net bags. In some embodiments, the first machine learning model can be trained on multiple types of data to generate multiple types of the first machine learning model. For example, the first machine learning model can be trained on a first type of data (e.g., images of bagged produce in transparent bags), a second type of data (e.g., images of bagged produce in net bags), on a third type of data (e.g., images of bagged produce in green bags) to generate a first type of the first machine learning model, a second type of the first machine learning model, a third type of the first machine learning model, respectively. In some embodiments, the first machine learning model can be a StartGAN trained on multiple types of data. Therefore, in some instances, the second machine learning model can be trained based on synthetic images generated by the multiple types of the first machine learning model and classify an image as a non-bagged produce, a bagged produce of a first bag type, a bagged produce of a second bag type, a bagged produce of a third bag type, and so forth.

Figure 5:
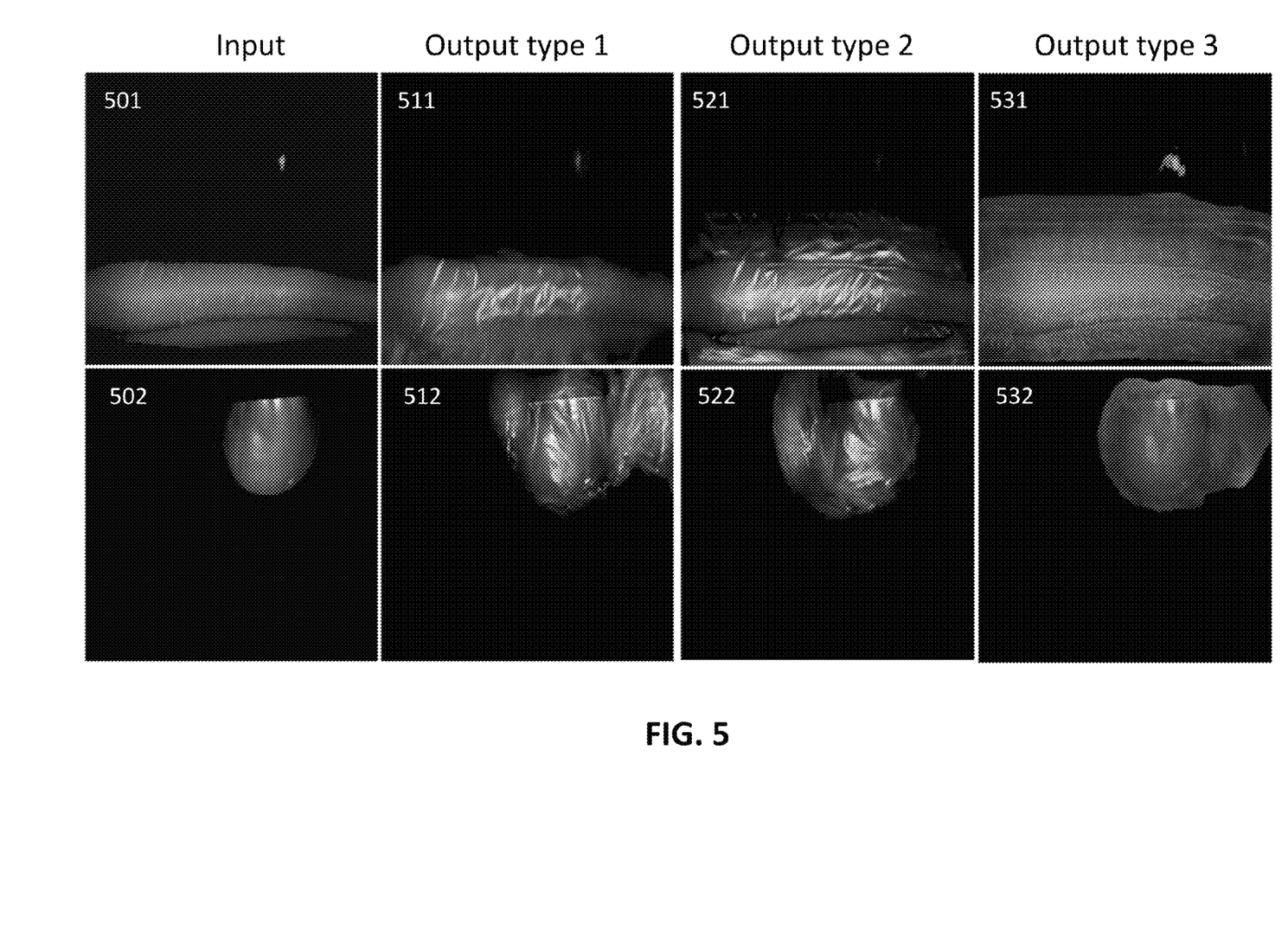
FIG. 5 shows examples of images of bagged produce generated by a machine learning model based on images of non-bagged produce, according to an embodiment.

FIG. 5 shows examples of images of bagged produce generated by a machine learning model based on images of non-bagged produce, according to an embodiment. As shown, a machine learning model (e.g., such as the first machine learning model 106 as shown and described with respect to FIG. 1) can be used to generate realistic images of bagged produce from images of non-bagged produce. FIG. 5 shows images of non-bagged produce that include an image of non-bagged carrot 501 and/or an image of non-bagged tomato 502. The machine leaning model can receive the images of non-bagged produce and generate multiple types of images of bagged produce. FIG. 5 shows images of non-bagged produce that include an image of bagged carrot of a first type 511 (transparent bag), an image of bagged tomato of a first type 512 (transparent bag), an image of bagged carrot of a second type 521 (green bag), an image of bagged tomato of a second type 522 (green bag), an image of bagged carrot of a third type 531 (net bag), and an image of bagged tomato of a third type 532 (net bag).

Figure 6:
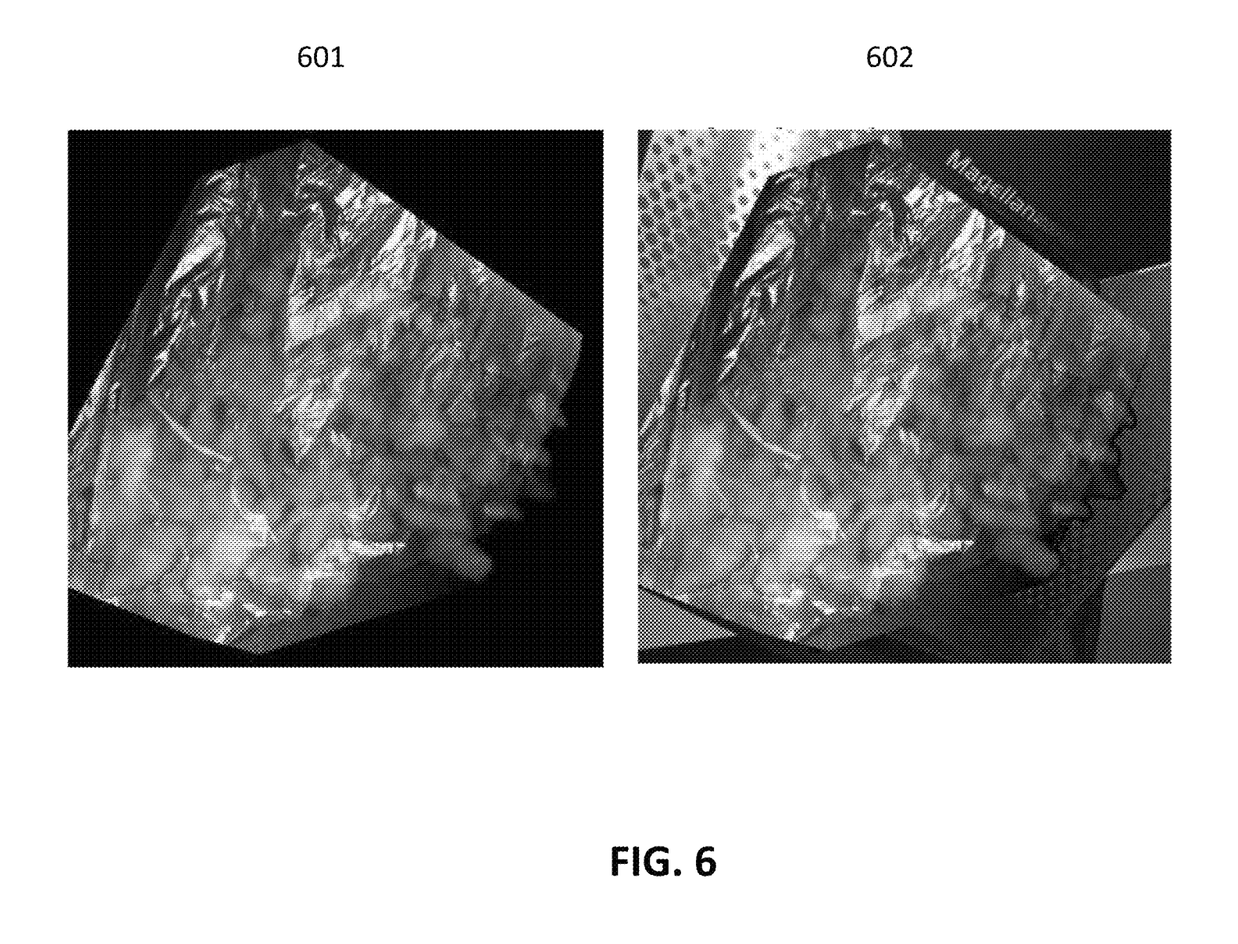
FIG. 6 shows an example of augmenting an image of bagged produce, according to an embodiment.

FIG. 6 shows an example of augmenting an image of bagged produce, according to an embodiment. A produce classification device (such as the produce classification device 101 as shown and described with respect to FIG. 1) can augment synthetic images generated by a machine learning model (machine learning model 106 as shown and described with respect to FIG. 1). As shown in the example of FIG. 6, the produce classification device can overlay a synthetic image to a background. FIG. 6 shows a synthetic image 601 that has a plain back ground (e.g., a white back ground, a black background, etc.). The produce classification device can be configured to detect and remove plain background portion of the synthetic image 601 to generate a transparent-background image (not shown). The produce classification device can then overlay the transparent-background image on a background image (e.g., an image of a scale, and image of a shopping cart, and/or the like) to produce an augmented image 602.

Figure 7:
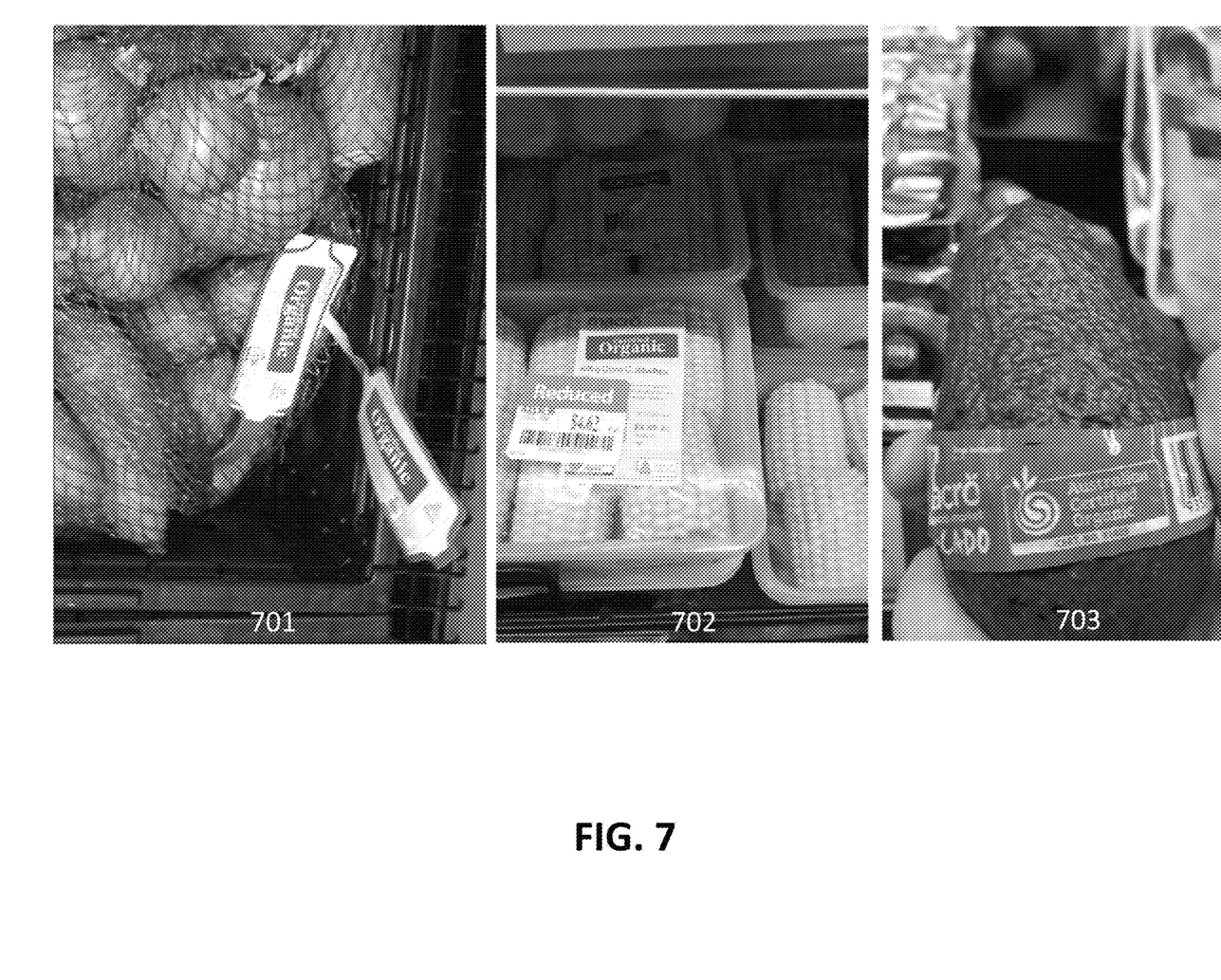
FIG. 7 shows examples of images of produce classified by the produce classification device.

FIG. 7 shows examples of images of produce classified by the produce classification device, according to an embodiment. As shown, a set of images classified by the produce classification device can include images of bagged produce of multiple type and/or images of non-bagged produce of multiple types (e.g., organic, inorganic, genetically modified organism (GMO), non-GMO, and/or the like). For example, a classification model (such as the second machine learning model 107 as shown and described with respect to FIG. 2) can be trained to further classify the set of images such as bagged organic produce 701, packaged organic produce 702, inorganic produce, GMO produce, non-GMO produce, Australian certified organic produce 703, and/or the like.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. For example, although some embodiments discussed above reduce labor by using images of non-bagged produce to generate synthetic images of bagged produce, in some embodiments, images of bagged produce can be processed to generate synthetic images of non-bagged produce. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    receiving a plurality of images of non-bagged produce;
    executing a first machine learning model to generate a plurality of images of bagged produce based on the plurality of images of non-bagged produce;
    training a second machine learning model based on the plurality of images of bagged produce and the plurality of images of non-bagged produce; and
    executing, after the training, the second machine learning model to classify as a bagged produce or a non-bagged produce an image not included in the plurality of images of non-bagged produce and not included in the plurality of images of bagged produce.

2. The method of claim 1, wherein the first machine learning model is a cycle generative adversarial network (CycleGAN).

3. The method of claim 1, wherein the second machine learning model is a deep neural network.

4. The method of claim 1, wherein:
    the plurality of images of non-bagged produce includes a first subset of images from the plurality of images of non-bagged produce and a second subset of images from the plurality of images of non-bagged produce, the first subset of images having images of non-bagged produce of a first type and not a second type, the second subset of images having images of non-bagged produce of the second type and not the first type,
    the plurality of images of bagged produce including a first subset of images from the plurality of images of bagged produce and a second subset of images from the plurality of images of bagged produced, the first subset of images having images of bagged produce of the first type and not the second type, the second subset of images having images of bagged produce of the second type and not the first type,
    executing the second machine learning model includes executing the second machine learning model to classify an image as a bagged produce of the first type, a bagged produce of the second type, a non-bagged produce of the first type, or a non-bagged produce of the second type.

5. The method of claim 1, wherein:
the plurality of images of bagged produce includes a first subset of images from the plurality of images of bagged produce and a second subset of images from the plurality of images of bagged produce, the first subset of images having images of bagged produce of a first type and not a second type, the second subset of images having images of bagged produce of the second type and not the first type,
the method further comprising:
training the first machine learning model based on the plurality of images of non-bagged produce and the first subset of images from the plurality of images of bagged produce, and not the second subset of images from the plurality of images of bagged produce.

6. The method of claim 1, wherein the plurality of images of non-bagged produce and the plurality of images of bagged produce include images of non-bagged produce with a background, images of non-bagged produce without a background, images of bagged produce with a background and images of bagged produce without a background.

7. The method of claim 1, wherein:
the plurality of images of bagged produce including a first subset of images from the plurality of images of bagged produce and a second subset of images from the plurality of images of bagged produced, the first subset of images having images of bagged produce of the first type and not the second type, the second subset of images having images of bagged produce of the second type and not the first type,
executing the second machine learning model includes executing the second machine learning model to classify an image as a bagged produce of the first type, a bagged produce of the second type, a non-bagged produce of the first type, or a non-bagged produce of the second type.

8. A non-transitory processor-readable medium storing code representing instructions to be executed by a processor of a first compute device, the code comprising code to cause the processor to:
receive, from a second compute device remote from the first compute device, a machine learning model trained, at the second compute device, based on a plurality of synthetic images of produce generated using a generative machine learning model;
receive an image of produce, the image of produce being (1) an image of non-bagged produce or (2) an image of bagged produce; and
execute the machine learning model to classify the image of produce as a bagged produce or a non-bagged produce,
the generative machine learning model includes a plurality of layers representing spatial hierarchies of patterns in the plurality of synthetic images.

9. The non-transitory processor-readable medium of claim 8, wherein the machine learning model is trained, at the second compute device, based at least in part on a plurality of synthetic images of produce.

10. The non-transitory processor-readable medium of claim 8, wherein the generative machine leaning model is a cycle generative adversarial network (CycleGAN).

11. The non-transitory processor-readable medium of claim 8, wherein the plurality of synthetic images of produce including a first subset of images from the plurality of synthetic images of produce and a second subset of images from the plurality of synthetic images of produce, the first subset of images having images of bagged produce and/or non-bagged produce of a first type and not a second type, the second subset of images having images of bagged produce and/or non-bagged produce of the second type and not the first type.

12. The non-transitory processor-readable medium of claim 8, wherein the machine learning model is a deep neural network.

13. The non-transitory processor-readable medium of claim 8, wherein the plurality of synthetic images of produce include images of bagged produce with a background, images of bagged produce without a background, images of non-bagged produce with a background, and images of non-bagged produce without a background.

14. The non-transitory processor-readable medium of claim 8, further comprising code to cause the processor to:
capture the image of produce using a camera.

15. A method, comprising:
receiving a plurality of first images of produce;
executing a first machine learning model to generate a plurality of second images of produce based on the plurality of first images of produce, the plurality of first images of produce being (1) images of non-bagged produce or (2) images of bagged produce, the plurality of second images of produce being the other of (1) images of non-bagged produce or (2) images of bagged produce;
training a second machine learning model based on the first plurality of images of produce and the second plurality of images of produce; and
executing, after the training, the second machine learning model to classify as a bagged produce or a non-bagged produce an image not included in the plurality of first images and not included in the plurality of second images.

16. The method of claim 15, wherein the first machine learning model is a cycle generative adversarial network (CycleGAN).

17. The method of claim 15, wherein the second machine learning model is a deep neural network.

18. The method of claim 15, wherein:
the plurality of first images of produce includes a first subset of images from the plurality of first images of produce and a second subset of images from the plurality of first images of produce, the first subset of images having images of bagged produce or non-bagged produce of a first type and not a second type, the second subset of images having images of bagged produce or non-bagged produce of the second type and not the first type,
the plurality of second images of produce includes a first subset of images from the plurality of second images of produce and a second subset of images from the plurality of second images of produce, the first subset of images having images of bagged produce or non-bagged produce of the first type and not the second type, the second subset of images having images of bagged produce or non-bagged produce of the second type and not the first type,
executing the second machine learning model includes executing the second machining learning model to classify the image as a bagged produce of the first type, a bagged produce of the second type, a non-bagged produce of the first type, or a non-bagged produce of the second type.

19. The method of claim 15, wherein:

the plurality of first images of produce includes a first subset of images from the plurality of first images of produce and a second subset of images from the plurality of first images of produce, the first subset of images having images of bagged produce or non-bagged produce of a first type and not a second type, the second subset of images having images of bagged produce or non-bagged produce of the second type and not the first type, the method further comprising:

training the first machine learning model based on the first subset of images and not the second subset of images.

20. The method of claim 15, wherein the plurality of first images of produce include images of bagged produce with a background, images of bagged produce without a background, images of non-bagged produce with a background, and images of non-bagged produce without a background.

21. The method of claim 15, wherein:

the plurality of first images of produce includes a first subset of images and a second subset of images, the first subset of images from the plurality of first images of produce having images of non-bagged produce of a first type and not a second type, the second subset of images from the plurality of first images of produce having images of non-bagged produce of the second type and not the first type, the plurality of second images of produce includes a first subset of images and a second subset of images, the first subset of images from the plurality of second images of produce having images of bagged produce of the first type and not the second type, the second subset of images from the plurality of second images of produce having images of bagged produce of the second type and not the first type, executing the second machine learning model includes executing the second machine learning model to classify an image as a bagged produce of the first type, a bagged produce of the second type, a non-bagged produce of the first type, or a non-bagged produce of the second type.

* * * * *